United States Patent
Jiménez Olazábal

(10) Patent No.: US 12,234,006 B2
(45) Date of Patent: Feb. 25, 2025

(54) ACTIVE TRIM SYSTEM OF A FLIGHT CONTROL SYSTEM OF AN AIRCRAFT

(71) Applicant: AIRBUS DEFENCE AND SPACE S.A.U., Getafe (ES)

(72) Inventor: Andrés Jiménez Olazábal, Getafe (ES)

(73) Assignee: AIRBUS DEFENCE AND SPACE S.A.U., Madrid (ES)

( * ) Notice: Subject to any disclaimer, the term of this patent is extended or adjusted under 35 U.S.C. 154(b) by 0 days.

(21) Appl. No.: 18/509,862

(22) Filed: Nov. 15, 2023

(65) Prior Publication Data
US 2024/0217650 A1   Jul. 4, 2024

(30) Foreign Application Priority Data
Dec. 29, 2022   (EP) ..................................... 22383314

(51) Int. Cl.
*B64C 13/04* (2006.01)
*B64C 13/08* (2006.01)
*B64C 13/28* (2006.01)

(52) U.S. Cl.
CPC .......... *B64C 13/0427* (2018.01); *B64C 13/08* (2013.01); *B64C 13/28* (2013.01)

(58) Field of Classification Search
CPC ... B64C 13/345; B64C 13/0427; B64C 13/28; B64C 13/08
See application file for complete search history.

(56) References Cited

U.S. PATENT DOCUMENTS

| | | | | |
|---|---|---|---|---|
| 4,607,202 A | * | 8/1986 | Koenig | B64C 27/58 318/646 |
| 5,735,490 A | * | 4/1998 | Berthet | G05D 1/0061 244/236 |
| 2013/0133465 A1 | * | 5/2013 | Kreitmair-Steck | G05G 9/047 74/504 |
| 2016/0304190 A1 | * | 10/2016 | Grohmann | B64C 13/505 |

FOREIGN PATENT DOCUMENTS

| | | |
|---|---|---|
| CA | 556723 A | 4/1958 |
| EP | 3069990 A1 | 9/2016 |

OTHER PUBLICATIONS

Search Report for EP22383314.6, dated Jun. 14, 2023, 3 pages.

* cited by examiner

*Primary Examiner* — Justin M Benedik
(74) *Attorney, Agent, or Firm* — Nixon & Vanderhye P.C.

(57) ABSTRACT

An active trim system of a flight control system of an aircraft that transmits a tactile feel to a pilot of the aircraft in response to a manoeuvre. The active trim system includes: a manual control member (6) an elastic deformation means (1) and a reversible actuator (2), intermediate linkage member (4) and a controller. The actuator (2) includes a rod (5) and a motor (3) parallel to the elastic deformation means (1) and is movable by the motor (3) and by the motion of the manual control member (6). The intermediate linkage member (4) is linked to the manual control member (6) between the manual control member (6) and the elastic deformation means (1) and the reversible actuator (2), a controller configured to: move the reversible actuator (2) to a predetermined zero position, and to provide stiffness against a displacement of the intermediate linkage member (4).

18 Claims, 3 Drawing Sheets

ACTIVE TRIM SYSTEM OF A FLIGHT CONTROL SYSTEM OF AN AIRCRAFT

RELATED APPLICATION

This application incorporates by reference and claims priority to European Patent Application No. 22383314.6, filed Dec. 29, 2022.

TECHNICAL FIELD

The invention relates to the field of flight control systems of an aircraft, and particularly to flight control systems providing a tactile feeling to a pilot on a manual control member in response to a maneuver of the aircraft.

BACKGROUND

Flight control systems for aircraft provide variable tactile feel for manually controlled mechanical members in charge of a flight control member, such as a lever actuated by the pilot.

Know types of trim systems include: trim systems of the passive type providing a constant resistive force independent of the position of the flight control member, and active or motorized trim systems providing a variable resisting force against an operation of a flight control member.

In passive systems trim systems, a feel force is used to control the forces that a pilot feels during operation. Passive system typically include a feel actuator, a manual control member with an end manually operable by the pilot and a passive spring-damper component linked to the manual control member.

A known active trim system includes: the manual control member for operating the flight control system and for transmitting the tactile feeling to the pilot, an elastic deformation means having a longitudinal axis, for instance, a damper or a spring, which is linked to the manual control member, and an actuator comprising a rod and a motor for its actuation. The rod of the actuator is in series with the elastic deformation means and is lineally displaceable in the direction of the longitudinal axis of the elastic deformation means. The actuator is movable by the motor to a required position, so the load transmitted by the elastic deformation to the manual control member means is adjusted. This target position of the actuator must withstand the load applied by the manual control member.

The trim actuator is used to transmit a sensation of forces to the pilot in response to the pivoting maneuvers that the pilot operates via the manual control member. The actuator is typically redundant in design, i.e., with more than one rod.

According to the above, the actuator has two main functionalities, the capability of positioning the zero-load of sensation of forces feel and providing the pilot with the artificial tactile feeling of maneuvering stick force by the capability to keep the target position to provide the required feel forces.

The spring in series with the actuator allows the feel force to be composed by the forces of the spring. The zero-load of the feel actuator is centered and controlled by the trim actuator based on a mechanical translation of the spring in series with the actuator as previously explained.

According to the above, to keep the target position of the actuator, the mechanical design defines an irreversible characteristic of the actuator that is able to avoid the motion of the actuator under the maximum operating external load applied by the manual control member. This characteristic could be achieved by friction, brake, or mechanical stop. Thus, the motion of the actuator is only possible from the electrical motor.

The zero-load centering compensation could be performed by pilot manual operation, or it could be performed by a computer controller that is able to operate the trim actuator depending on flight conditions. This controller operates the trim electrical motor.

When the centering operation is performed by a computer, the system requires a control-monitor computing device for safety reasons. The monitor computing device validates and allows the operation calculated or performed by the control computing system. Any discrepancy detected by the monitor computing device, or loss of one computing device, will not validate the operation of the control system avoiding the zero-load trim operation.

As the trim actuator is irreversible, external electrical failures that causes unintended motion of motor could cause an "uncountered trim runaway" failure in which the actuator is fully retracted or extended. The pilot capability for maneuverability aircraft is reduced if an uncountered trim runaway occurs.

SUMMARY OF THE INVENTION

An active trim system of a flight control system for an aircraft has been developed that transmits a tactile feeling or sensation of forces to a pilot of the aircraft through a manual control member in response to a maneuver of the flight control member.

An embodiment of the active trim system comprises:
(i) a manual control member for operating the flight control system and for transmitting the tactile feeling to the pilot,
(ii) an elastic deformation means having a longitudinal axis,
(iii) a reversible actuator comprising a rod and a motor, the rod of the reversible actuator being located parallel to the elastic deformation means and being lineally displaceable in the direction of the longitudinal axis of the elastic deformation means. The reversible actuator being movable by the motor and by the motion of the manual control member,
(iv) an intermediate linkage member mechanically linked to the manual control member, lineally displaceable in the direction of the longitudinal axis of the elastic deformation means by the motion of the manual control member and/or of the reversible actuator and located between the manual control member, and the elastic deformation means and the reversible actuator, and
(v) a controller in connection with the motor of the reversible actuator and configured to move the reversible actuator and in turn the elastic deformation means to a predetermined zero position, and to provide stiffness against a displacement of the intermediate linkage member by the manual control member. The predetermined zero position may be a trim position set by the pilot for a flight control surface moved by the manual control element.

Parallel is understood in this invention as everywhere equally distant, such as the elastic deformation means and the rod of the reversible actuator are equally distant along their lengths.

Stiffness is the extent to which an object resists deformation in response to an applied force. Stiffness is provided by the reversible actuator and the elastic deformation means to the intermediate linkage member and hence to the manual control member.

Reversible actuator means that is movable by the motor and also by the motion of the manual control member, therefore the pilot may exert a force that moves the reversible actuator.

The invention may be used to implement a redundant control system able to control the feel forces with an active systems. The system allows the feel forces to be composed of the sum of the forces of the elastic deformation means and the added forces of the parallel reversible actuator.

The system may be configured to operate the motor of the reversible actuator in the same way as in the state of the art to minimize the differences of control demands. The controller controls actively the feel forces. The trim actuator positions the zero-load force according to the flight conditions and provides an added virtual stiffness of the tactile feel forces.

The known series architecture of the state of the art is a system that feel loads are composed only of the stiffness of the elastic deformation means whose centered mechanical position is positioned by the actuator. In contrast, the parallel architecture of the spring and actuator of the trim system disclosed here provides a system in which a pilot feel loads that are composed of the added forces of the elastic deformation means and the parallel reversible actuator. This allows for modification of the zero position (trim position) and the stiffness provided by the elastic deformation means with the additional stiffness provided by the reversible actuator to better adapt to the flight conditions.

The parallel reversible actuator could add loads in both directions in order to modify the zero-load and the stiffness of spring to achieve the feel force required for operation. The above active trim system is able to actively control the tactile feeling operation of flight control system in order to add, increase or reduce, feel forces to the spring forces to achieve the forces required according to the flight conditions.

Thus, invention may be embodied as a redundant control system able to control the tactile feel forces with an active and reversible mechanism wherein the pilot could operate the total control of positioning.

DESCRIPTION OF THE FIGURES

To complete the description and to provide for a better understanding of the invention, a set of drawings is provided. Said drawings form an integral part of the description and illustrate preferred embodiments of the invention. The drawings comprise the following figures.

DETAILED DESCRIPTION

Figure 1:
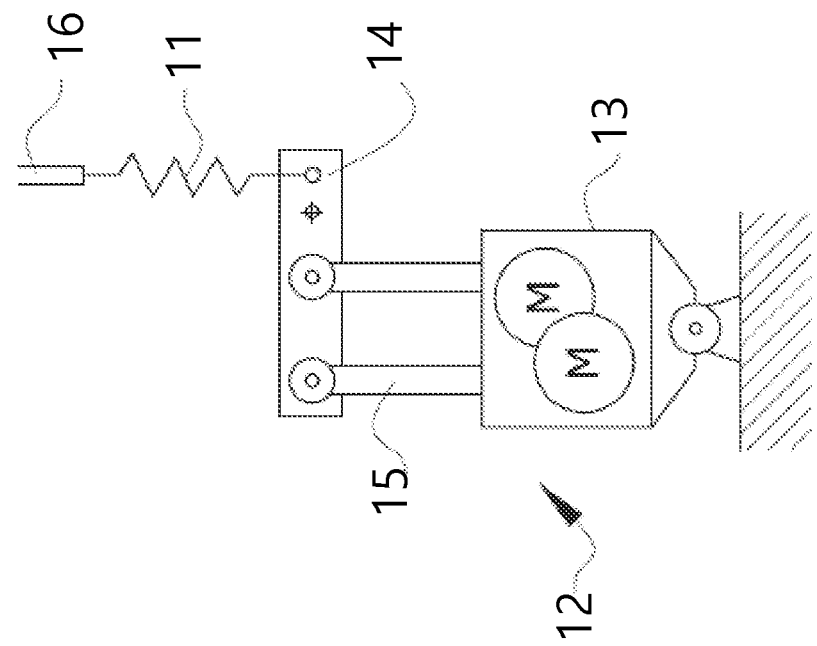
FIG. 1 shows a schematic diagram showing a series trim system according to the state of the art.

FIG. 1 discloses series trim system according to the state of the art. The trim system comprises:
(i) a manual control member (16) for operating the flight control system and for transmitting the tactile feeling to the pilot, the manual control member (16) having an end manually operable by the pilot of the aircraft,
(ii) an elastic deformation means (11), such as a spring, having a longitudinal axis mechanically linked to the manual control member (6),
(iii) an irreversible actuator (12) comprising a rod (15) and a motor (13). The irreversible actuator (12) being actuated by the motor (13). The rod (15) of the irreversible actuator (2) being placed in series with the elastic deformation means (11) both being lineally displaceable in the same direction, and
(iv) an intermediate linkage member (14), such as a rotatable lever arm, located between the elastic deformation means (11) and the irreversible actuator (12).

The elastic deformation means (11), and the irreversible actuator (12) are mechanically linked to the intermediate linkage member (14) at one of their ends. They are specifically joined to the intermediate linkage member (14). The other end of the elastic deformation means (11) is in connection with the manual control member (16) and the other end of the reversible actuator (12) is joined to an aircraft structure.

Figure 2:
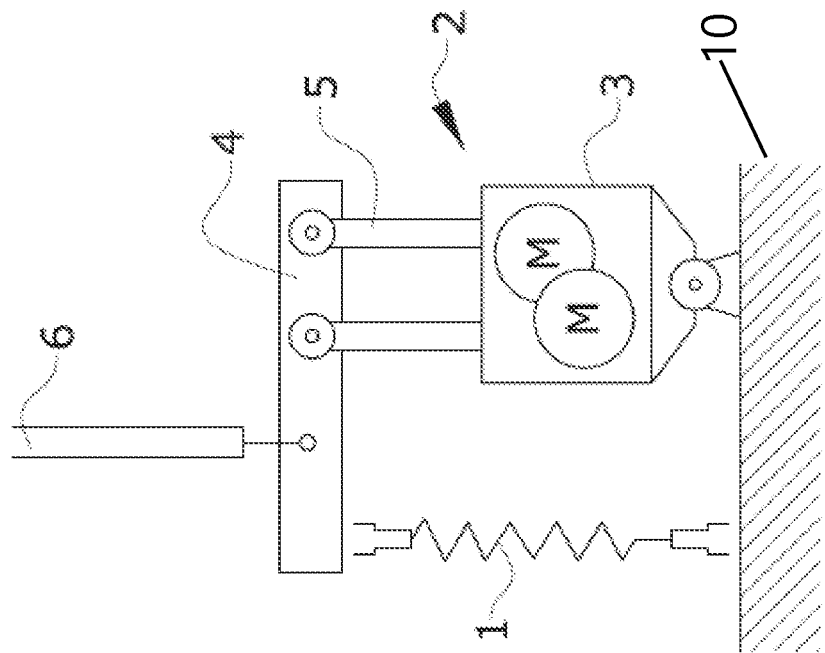
FIG. 2 shows a schematic diagram showing an embodiment of a parallel trim system according to the invention.

FIG. 2 discloses an embodiment of the invention as an active trim system comprising:
(i) a manual control member (6) for operating the flight control system and for transmitting the tactile feeling to the pilot (9 in FIG. 4),
(ii) an elastic deformation means (1), such as a spring,
(iii) an reversible actuator (2) comprising a rod (5) and a motor(s) (3). The rod (5) of the reversible actuator (2) is parallel to the elastic deformation means (1) and is lineally displaceable in the direction of the longitudinal axis of the elastic deformation means (1).

The intermediate linkage member (4) mechanically linked to the manual control member (6) and located between the manual control member (6) and the elastic deformation means (1) and the reversible actuator (2).

In the active trim system shown in FIG. 2, the reversible actuator (2) may be redundant such as including two motors (3) and two rods (5).

The spring may be a helicoidal spring.

The elastic deformation means (1) and the reversible actuator (2) are joined to the intermediate linkage member (4) at one of their ends. They are joined at their opposite ends to a fixed aft structure (10) of the aircraft. An end of the manual control member (6) is joined to the intermediate linkage member (4).

Figure 4:
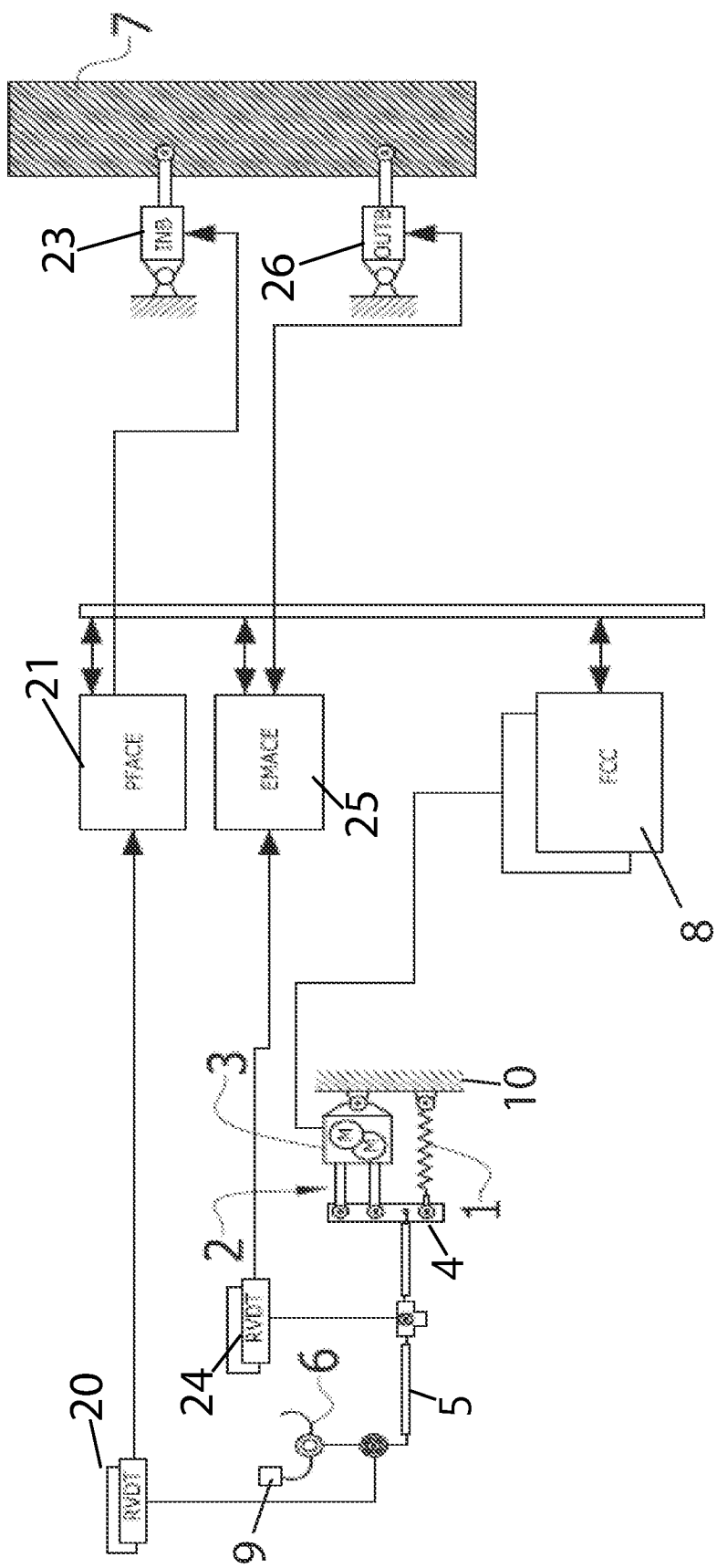
FIG. 4 shows a schematic representation of an embodiment of a flight control system comprising an active trim system.

As shown in FIG. 4, controller (8), e.g., a flight control computer (FCC), may be configured to disconnect the motor (3) in response to a failure condition such an electrical failure. When the motor is disconnected, the reversible actuator (2) is movable by the motion of the manual control member (6) so that the tactile feeling transmitted to the manual control member (6) comes only from the elastic deformation means (1).

Thus, the active trim embodiment avoids any runaway of feel force trim actuator (2) as it is based on a reversible system. In case of failure of the actuator (2), an electrical disconnection is performed and therefore the parallel added forces are removed. The reversible actuator (2) is disconnected automatically with the computer or manually by pilot action.

An advantage of an embodiment of the invention is that the pilot can continue operation of the flight control system with just the feel forces composed of only the elastic deformation means (1). Any runaway or not controlled operation of the actuator (2) is avoided by electrical disconnection. This will produce that the tactile feel force will be only of the passive elastic deformation means (1) without the actuation of the parallel reversible actuator (2). Thus, a fixed feel elastic element provides a fixed force gradient when the trim actuator (2) is disengaged. It has to be noted that the elastic deformation means (1) is a mechanical system that depends neither on a computer nor on electrical supply.

Thus, the active trim system implements a redundant control system able to control the tactile feel forces with an active and reversible mechanism wherein the pilot could operate the total control of positioning even in a situation of an uncountered runaway of feel actuator (2). Although it may imply an over-workload for the pilot, the pilot can operate the flight control element through the manual control member (6).

In an embodiment, in a failure, the forces will be centered to a certain position pre-defined by operation requirement, i.e., to a pre-set zero-load position.

Due to safety reasons, the auto trim operation performed by a computer requires a control/monitor computing system. A monitor computing device validates and allows the operation calculated/performed by the control computing device. Any discrepancy detected by the monitor computing device, or loss of one computing device will not validate the operation of the control device and the operation is not allowed. This control operation crosscheck performed by the monitor computing device allows to avoid any failure, mainly a runaway failure, of trim actuator (2). As the actuator (2) is reversible that means that in case of any failure or unintended operation the monitor device will switch-off the reversible actuator (2), as previously explained, but still keeping the operation with the elastic deformation means (1) feel forces.

In addition, the tactile feel trim actuator (2) is designed to introduce a maximum force, even in case of failure, lower than the maximum force that pilot can apply to the manual control member (6) for a long period of time so that the pilot is able to manipulate the manual control member (6) by himself to control the aircraft.

In an embodiment, the intermediate linkage member (4) comprises a sensor for measuring the displacement of the elastic deformation means (1) that is the input force of the pilot since the position of the irreversible actuator (2) is already known.

Figure 3:
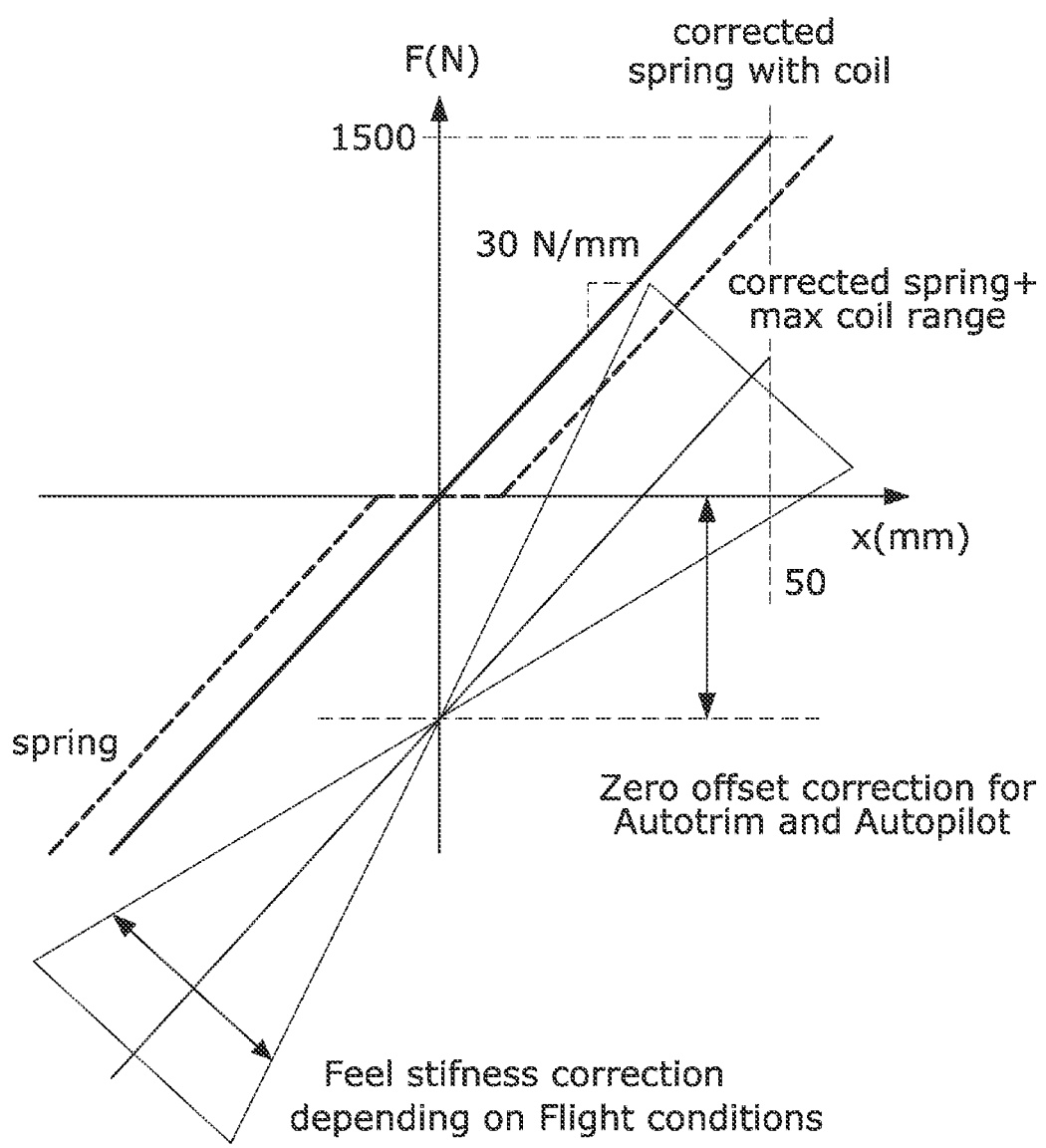
FIG. 3 shows a representation of reversible actuator and passive spring system performances.

FIG. 3 discloses a representation of reversible actuator (2) and passive spring system (1) performances.

As previously stated, the operation of feel forces is based on the force of two components, the spring that provides zero-load and stiffness feel and the parallel reversible actuator (2) that provides an added stiffness. The parallel reversible actuator (2) adds forces to the spring in both direction, as they are placed in parallel, by controlling a close loop current whose target is the operating feel force target. The parallel reversible actuator (2) mechanically deforms the spring to sum or subtract forces.

As can be seen in FIG. 3, according to the performance of the parallel reversible actuator (2), the mechanical deadzone or hysteresis of the spring mechanics can be corrected by adding or subtracting the required forces of the spring stiffness in order to obtain a continuous curve along the complete stroke of the actuator (2).

The system with a parallel reversible actuator, in an embodiment, is able to introduce an offset in the spring position in order to vary the zero-force position of the spring according to flight conditions.

In addition, the feel stiffness, force-stroke slope of spring, could be controlled by adding/removing force with the parallel reversible actuator (2) in order to, for instance, increase the stiffness at high speed or reduced it at low speed.

FIG. 4 shows a schematic representation of a flight control system comprising an active trim system according to an embodiment of the invention. It discloses a manual control member (6), such as a wheel operated by the pilot (9), an intermediate linkage element (4) linked to the manual control member, the reversible actuator (2), and a spring (1). A flight control element (7), e.g., a flap, rudder, elevator, alerion or other flight control surface, is moved based on the linked movements of the manual control member and the intermediate linkage element.

A sensor (20), such as a linear or rotary variable differential transformer (RVDT or LVDT) detects the amount of movement of the manual control member and transmits a sensor signal indicating the movement to a processor (21—PFACE) which controls an actuator (23—IN_B) to move the flight control element (7). Similarly, a sensor (24) detects the amount of movement of the rod (5) or linkage (4) and transmits a sensor signal indicating the movement to a processor (25—EMACE) which controls an actuator (26—OUT_B) to move the flight control element (7). In the embodiment shown FIG. 4, the amount of movement may be a degree of rotation of the manual control member (6), e.g., wheel, and a linear or rotation of the rod (5).

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. It is to be noted that the term "or" as used herein is to be interpreted to mean "and/or", unless expressly stated otherwise.

The invention claimed is:

1. An active trim system of a flight control system of an aircraft configured to transmit a tactile feeling to a pilot of the aircraft in response to a manoeuvre, the active trim system comprising:

a manual control member configured to operate the flight control system and transmit the tactile feeling to the pilot, an elastic deformation device having a longitudinal axis, a reversible actuator comprising a rod and a motor, wherein the rod is parallel to the longitudinal axis of the elastic deformation device, lineally displaceable in the of the longitudinal axis and is movable by the motor and by motion of the manual control member, an intermediate linkage member mechanically linked to the manual control member, lineally displaceable in the direction of the longitudinal axis of the elastic deformation device by the motion of the manual control member and/or of the reversible actuator and is between the manual control member and the elastic deformation device and between the manual control member and the reversible actuator, and a controller for the reversible actuator and configured to cause the reversible actuator to move to a predetermined zero position and provide stiffness against a displacement of the intermediate linkage member by the manual control member.

2. The active trim system according to claim 1, wherein in response to a failure condition in the active trim system, the controller is configured to electrically disconnect the motor such that the reversible actuator is movable only by the motion of the manual control member so that the tactile feeling transmitted to the manual control member comes only from the elastic deformation device.

3. The active trim system according to claim 2, wherein in a failure the controller is configured to move the reversible actuator to a pre-set zero position.

4. The active trim system according to claim 1, wherein the elastic deformation device and the reversible actuator are joined to the intermediate linkage member at one of their ends and are configured to be joined to an aircraft structure at their other end and an end of the manual control member is joined to the intermediate linkage member.

5. The active trim system according to claim 1, wherein the elastic deformation device includes a spring.

6. The active trim system according to claim 5, wherein the spring comprises a helical spring.

7. The active trim system according to claim 1, wherein the reversible actuator is redundant comprising at least two motors and at least two rods.

8. The active trim system according to claim 1, wherein the reversible actuator is configured to provide a maximum force lower than a maximum force that the pilot can apply to the manual control member for a period of time.

9. The active trim system according to claim 1, wherein the intermediate linkage member comprises a sensor for measuring the displacement of the elastic deformation device.

10. An active trim system of a flight control system of an aircraft comprising:
a manual control member configured to operate the flight control system and transmitting the tactile feeling to the pilot;
an intermediate linkage member mechanically linked to the linkage connection on the manual control member;
a spring with a longitudinal axis and connected to the intermediate linkage member and to a structure in the aircraft,
a reversible actuator including a rod connected in series with a motor forming a rod and motor assembly, wherein one end of the rod and motor assembly is connected to the intermediate linkage member and an opposite end is connected to the structure, the rod and motor assembly is parallel to the spring, the rod is moved back and forth by the motor in a direction of the longitudinal axis, and the reversible actuator is movable by the motor and manually by the manual control member,
wherein the reversible actuator is configured to automatically move the intermediate linkage member to a predetermined zero position in absence of a manually applied force to the manual control member.

11. The active trim system according to claim 10, wherein in response to a failure condition in the active trim system, the controller is configured to electrically disconnect the motor such that the reversible actuator is movable only by the motion of the manual control member and the spring.

12. The active trim system according to claim 10, wherein the spring is configured to bias the intermediate linkage member to the predetermined zero position.

13. The active trim system according to claim 10, wherein the reversible actuator is configured to provide a maximum force lower than a maximum force that a pilot can apply to the manual control member.

14. The active trim system according to claim 10, wherein the intermediate linkage member comprises a sensor configured to sense a displacement of the intermediate linage member.

15. A method comprising:
manually moving a flight control member to move a flight control surface of an aircraft, wherein the flight control surface is linked to an intermediate linkage member and the movement of the flight control member moves the intermediate linkage member along a first direction;
automatically moving the flight control member to a trimmed position while the pilot is not applying manual force to the flight control member by automatically moving the intermediate linkage member by actuating a reversible actuator including a rod connected in series to a motor forming a rod and motor assembly, wherein the rod and motor assembly is connected to the intermediate linkage member and to a structure of the aircraft, and the rod is aligned along the first direction;
applying a bias force to the intermediate linkage member by a spring connected to the intermediate linkage member and to the structure, wherein the spring is parallel to the rod and motor assembly, the bias force is aligned with the first direction, and
deactivating the motor such that the motor does not apply force to the rod in response to a failure condition related to a trim system which includes the actuator.

16. The method of claim 15, further comprising during the failure condition, the reversible actuator is movable by the motion of the manual control member and the spring.

17. The method of claim 15, further comprising the pilot adjusting the trim position by adjusting a force applied by the spring to bias the intermediate linkage member to a predetermined zero position corresponding to the trim position.

18. The method of claim 15, further comprising applying a maximum force from the reversible actuator to intermediate linkage which is less than a maximum force the pilot can apply to the manual control member.

* * * * *